(12) United States Patent
Selvaraj

(10) Patent No.: US 12,405,109 B2
(45) Date of Patent: Sep. 2, 2025

(54) HANDHELD ELECTRONIC DEVICE FOR GEOMETRIC MEASUREMENTS AND MARKING AN INTERSECTION POINT

(71) Applicant: Rajesh Selvaraj, Apex, NC (US)

(72) Inventor: Rajesh Selvaraj, Apex, NC (US)

( * ) Notice: Subject to any disclaimer, the term of this patent is extended or adjusted under 35 U.S.C. 154(b) by 958 days.

(21) Appl. No.: 17/531,587

(22) Filed: Nov. 19, 2021

(65) Prior Publication Data

US 2022/0155066 A1 May 19, 2022

Related U.S. Application Data

(60) Provisional application No. 63/115,757, filed on Nov. 19, 2020.

(51) Int. Cl.
*G01C 3/06* (2006.01)
*G01C 3/16* (2006.01)

(52) U.S. Cl.
CPC ............... *G01C 3/06* (2013.01); *G01C 3/16* (2013.01)

(58) Field of Classification Search
None
See application file for complete search history.

(56) References Cited

U.S. PATENT DOCUMENTS

| | | | |
|---|---|---|---|
| 2005/0057745 A1* | 3/2005 | Bontje | G01C 15/002 356/139.03 |
| 2006/0259269 A1* | 11/2006 | Binder | G01C 15/002 702/155 |
| 2011/0288818 A1* | 11/2011 | Thierman | G01B 17/00 702/155 |
| 2017/0169604 A1* | 6/2017 | Van Der Zwan | G06T 7/579 |

* cited by examiner

*Primary Examiner* — Luke D Ratcliffe
(74) *Attorney, Agent, or Firm* — Barry Choobin; Patent 360

(57) ABSTRACT

A handheld electronic device that includes two or more multi-axis distance measurement sensors for simultaneously measuring distance from two or more reference points in space. The device is used to locate a target point on a surface at the predetermined distances from the two or more reference points. The device can further include a marking unit to mark the target point on the surface.

14 Claims, 5 Drawing Sheets

HANDHELD ELECTRONIC DEVICE FOR GEOMETRIC MEASUREMENTS AND MARKING AN INTERSECTION POINT

CROSS-REFERENCE TO RELATED APPLICATIONS

This application claims priority from the U.S. provisional patent application Ser. No. 63/115,757, filed on Nov. 19, 2020, which is incorporated herein by reference in its entirety.

FIELD OF INVENTION

The present invention relates to a handheld electronic device for geometric measurements, and more particularly, the present invention relates to a handheld device that can electronically and simultaneously measure in two or more directions and mark an intersection point.

BACKGROUND

Tape measure or flexible measure or rigid rulers or electronic range finders are used to measure distances between two points. These tape measures and rulers are the most common tool for measuring distances. However, using such devices can become laborious, particularly, when the two points are distant from each other. One end of the tape measure/ruler is fixed to a starting point and the tape measure/ruler is extended up to the second point across which the distance has to be measured. Also, often a need arises to measure distances from two or more points in a plane or 3D space. For example, to hang a frame on a wall at 3 feet from a ceiling and 4 feet from a nearby sidewall. To mark a target point on the wall for the nail to hang the frame, one has to use a tape measure/ruler in combination with a spirit level or laser level to ensure correct measurement. The whole process is complex, challenging, and time-consuming, especially if accuracy and repeatability are desired. The problem compounds itself with the increase in reference points relative to which the target point is to be marked.

Thus, a need is appreciated for a device that can be used to mark a target point relative to multiple reference points in space.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a handheld electronic device to mark a target point on a surface at predetermined distances from two or more reference points in space.

It is another object of the present invention that the device can simultaneously measure distances in more than one direction.

It is still another object of the present invention that the device can simultaneously measure distances from two or more reference planes.

It is another object of the present invention that the target point can be visibly marked on a surface by the device.

It is still another object of the present invention that the device can be operated by a single person.

It is yet another object of the present invention that the device can be economical to manufacture.

It is a further object of the present invention that the device is quick and easy to use.

It is still a further object of the present invention that the device can be used to locate studs in the wall.

In one aspect, disclosed is a handheld device that includes two or more multi-axis distance measurement sensors that can easily orient and align to reference planes at whatever angle the situation presents. The device can include a dock for mounting a mobile computing device, such as a smartphone. Alternatively, a computing device can be built into the disclosed device. An application can be installed in a mobile computing device that can provide an interface for interacting with the disclosed device.

In one aspect, disclosed is an electronic device for simultaneously measuring distances from two or more reference points in space to locate a target point on a surface, the electronic device can include a housing having a front wall, a rear wall, a left wall, a right wall, a top wall, and a bottom wall; at least two multi-axis distance measurement sensors encased in the housing, wherein the at least two multi-axis distance measurement sensors configured to simultaneously measure distances of an intersection point on the rear wall of the housing from at least two reference points in space respectively; and a display on the front wall of the housing configured to display values of the measured distances. Preferably, three multi-axis distance measurement sensors can be incorporated. The housing has three sensor apertures in the left wall, the top wall, and the right wall respectively for the three multi-axis distance measurement sensors, the three multi-axis distance measurement sensors configured to simultaneously measure the distances of the intersection point from three reference points. The three multi-axis distance measurement sensors are encased in three sensor units, wherein each of the three sensor units further comprises a laser, wherein the three lasers are configured to point at the respective three reference points.

In one implementation of the electronic device, the housing further comprises a handle forming a T-shape, wherein the handle is configured to be grabbed in a hand for operating the electronic device. The housing can further include a central aperture in the rear wall, the electronic device further comprises a marking unit encased in the housing, the marking unit has a tip, the tip configured to protrude from the central aperture, wherein a center of the central aperture, the tip of the marker, and the intersection point coincide. The electronic device further comprises a button configured to be operated to actuate the marking unit, wherein actuation of the marking unit results in extension of the tip of the marker from the central aperture.

In one implementation of the electronic device, the electronic device further comprises a microcontroller, the microcontroller configured to present an interface for interacting with the electronic device and receive and store values of predetermined distances for a target point.

In one implementation of the electronic device, the electronic device further comprises an accelerometer and gyroscope.

In one implementation of the electronic device, the electronic device further comprises a mounting plate disposed on the front wall of the housing, the mounting plate configured to dock a mobile computing device, wherein the microcontroller configured to operably coupled to the mobile computing device. The mobile computing device can be a smartphone, the microcontroller configured to implement an interface on the smartphone, the interface configured to operate an accelerometer and a gyroscope of the smartphone.

In one aspect, disclosed is a method for simultaneously measuring distances from two or more reference points in space to locate a target point on a surface using the disclosed device, wherein the target point is at pre-determined distances from the two or more reference points.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
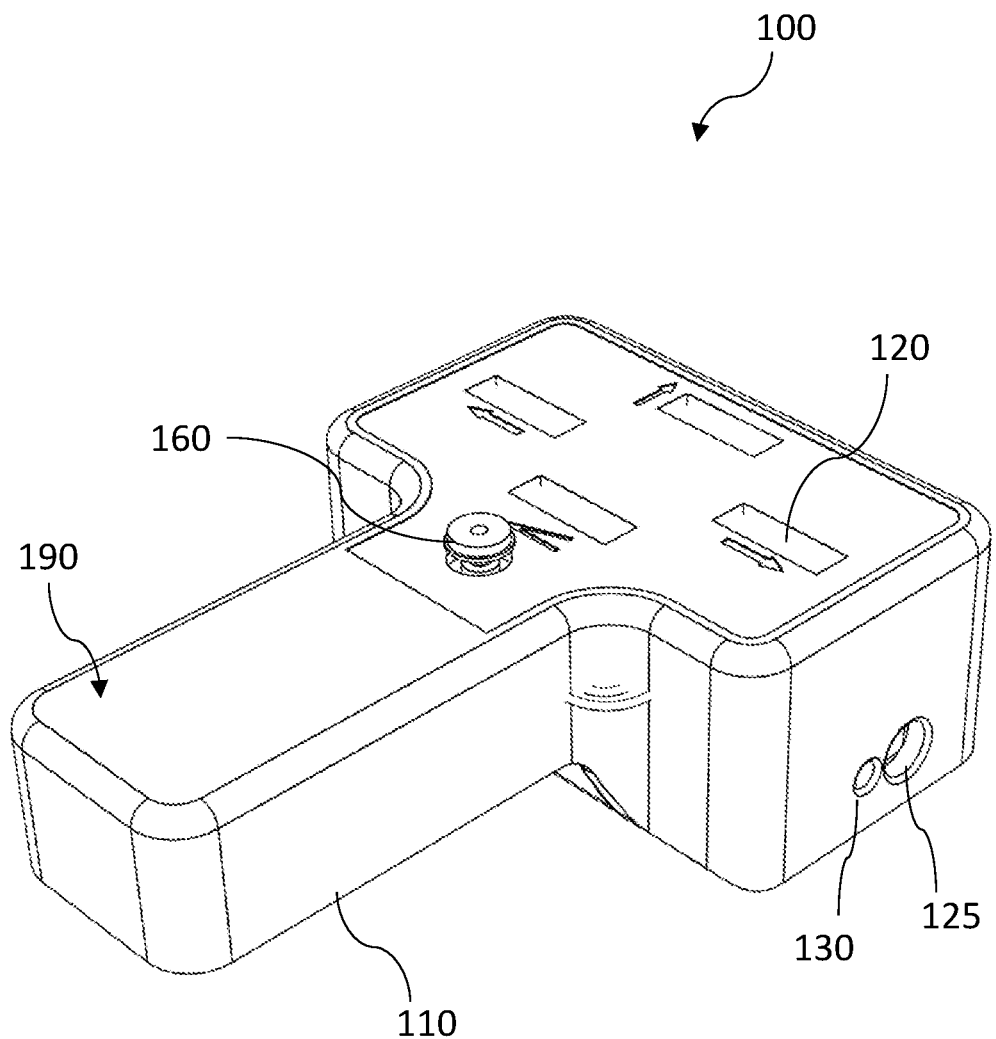
FIG. 1 is an isometric view of the electronic device, according to an exemplary embodiment of the present invention.
Figure 2:
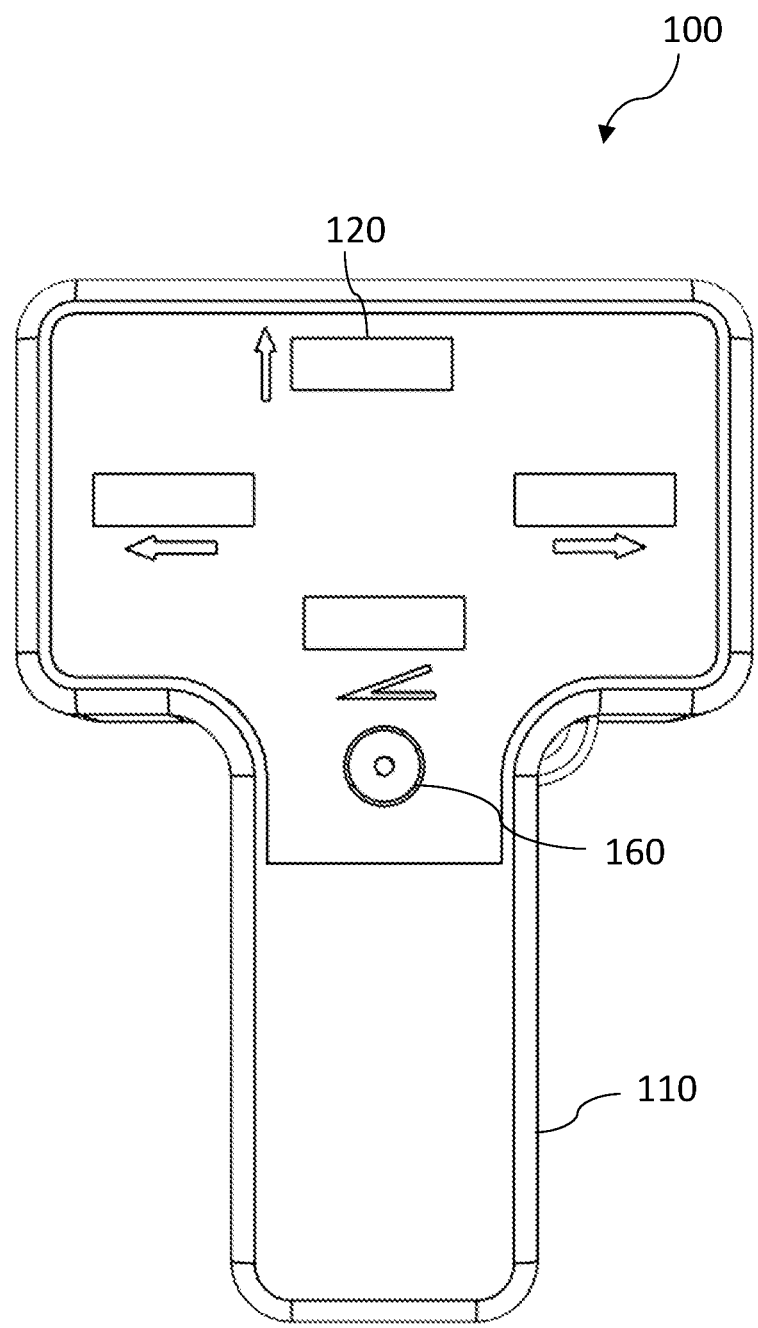
FIG. 2 is a front view of the electronic device shown in FIG. 1, according to an exemplary embodiment of the present invention.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Disclosed is a handheld device that can be used to measure distances from two or more reference points or planes in space to locate a target point on a surface that is at predetermined distances from the reference points or planes. The target point can be at an intersection point of vectors to the reference points, wherein the length of the vectors corresponds to the predetermined distances. The target point on the surface can be visibly marked by the device. For example, a target point on a wall at predetermined distances from the ceiling and the sidewall, wherein the ceiling and the sidewall can be reference planes and the reference points can be on the reference planes. The predetermined distances can be the desired distances for the target point. For example, 5 feet from the ceiling and 6 feet from the sidewall can be the predetermined distances. The reference planes may need not be right angles to each other.

Referring to FIGS. 1-4 which shows an isometric view, front view, rear view, and an exploded view of the device 100. The device 100 can include a housing 110 that can be of a T-shape such that it can be easily and ergonomically handled in the hand of a user and moved across a surface for taking the measurements. The housing 110 can have a front wall, a rear wall, a left wall, a right wall, a top wall, and a bottom wall defining a volume of the housing. The housing 110 can be extended at the bottom wall forming the T-shape, wherein the extension can act as a handle 190. On the front side of the device 100 can be seen four display panels 120 that show values of linear measurements and angles. On the right side of the device, as seen in FIG. 1, can be two adjacent holes in the housing, the first sensor hole 125 and the second laser hole 130. Similarly, the other sides of the housing i.e., the left wall and the top wall (shown in FIG. 3) can also have two adjacent holes. The bigger sensor hole can be for a multi-axis distance measurement sensor 140 while the smaller lase hole 130 can be for a laser. The disclosed device 100 can have three multi-axis distance measurement sensors 140, as shown in the exploded view. Each multi-axis distance measurement sensor can measure a distance from a reference point, so the three multi-axis distance measurement sensors can simultaneously measure distances from three different reference points. Two or three multi-axis distance measurement sensors can simultaneously send two or three vectors to two or three reference points, the two or three vectors can coincide at a central intersection point 150 on the rear wall of the housing 110. The three display panels 120 on the front side of the housing can be associated with the three multi-axis distance measurement sensor 140 and can show the three distances of this intersection point 150 from the respective reference points. The multi-axis distance measurement sensor can be easily oriented and aligned to reference planes at whatever angle the situation presents. Visible in the exploded view, the multi-axis distance measurement sensor can be encased in a sensor housing which also encases a laser. The laser can show where the measurements are pointed at by being directed to the reference point. The laser hole 130 is for the laser while the sensor hole 125 is for the multi-axis distance measurement sensor. The values of the measured distances from the three multi-axis distance measurement sensors can be updated and shown in the three displays simultaneously in real-time.

Figure 3:
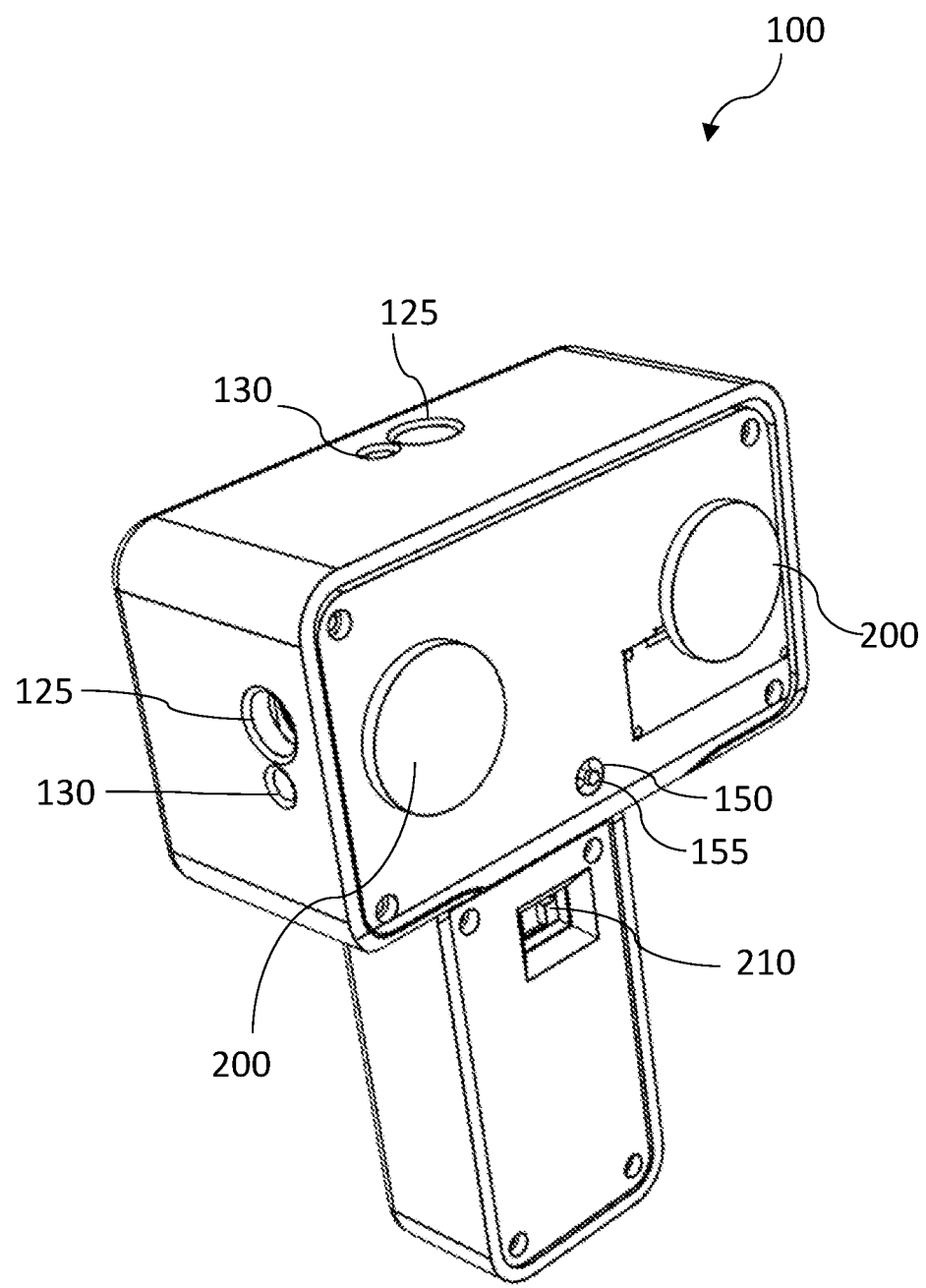
FIG. 3 is a rear view of the electronic device shown in FIG. 1, according to an exemplary embodiment of the present invention.
Figure 4:
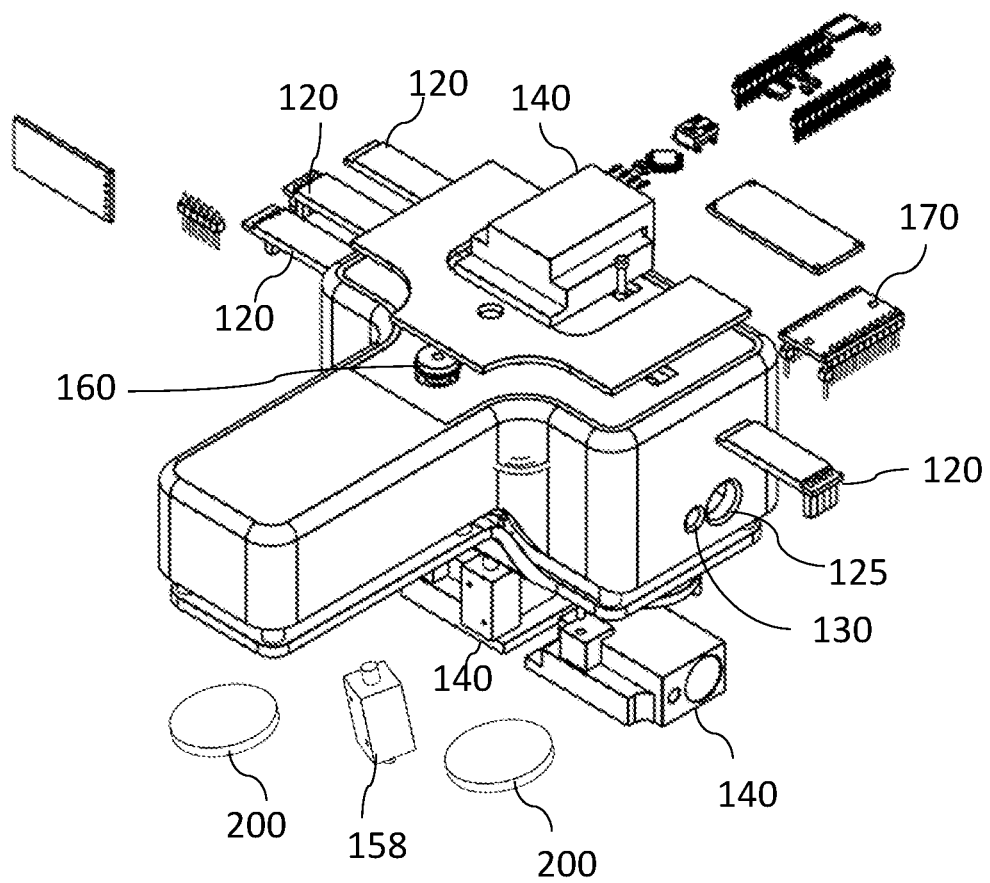
FIG. 4 is an exploded view of the electronic device shown in FIG. 1, according to an exemplary embodiment of the present invention.

At the intersection point 150 in FIG. 3 can be seen an aperture in the housing and through this aperture can protrude a marker tip 155 for making the target point on the surface, such as on the wall. The marker can be an ink cartridge or similar marking device that can make a visible mark on the surface. The device 100 can include a mechanism to extend and retract the marker tip, and such the mechanism can be mechanical or electronic. A marking unit 158 can encase the marker, the mechanism, and the marking tip. A button 160 can be seen in FIG. 1 on the front side of the housing 110, the button 160 can be actuated by thumb or finger while holding the device 100 in hand, wherein pressing the button 160 may result in actuation of the marker tip. However, the actuation of the marker can also be automated, once the precise location of the target point can be located i.e., values of the measured distances by the device are substantially equal to the predetermined distances for the target point, the marker can be actuated by the device to mark the target point.

Figure 5:
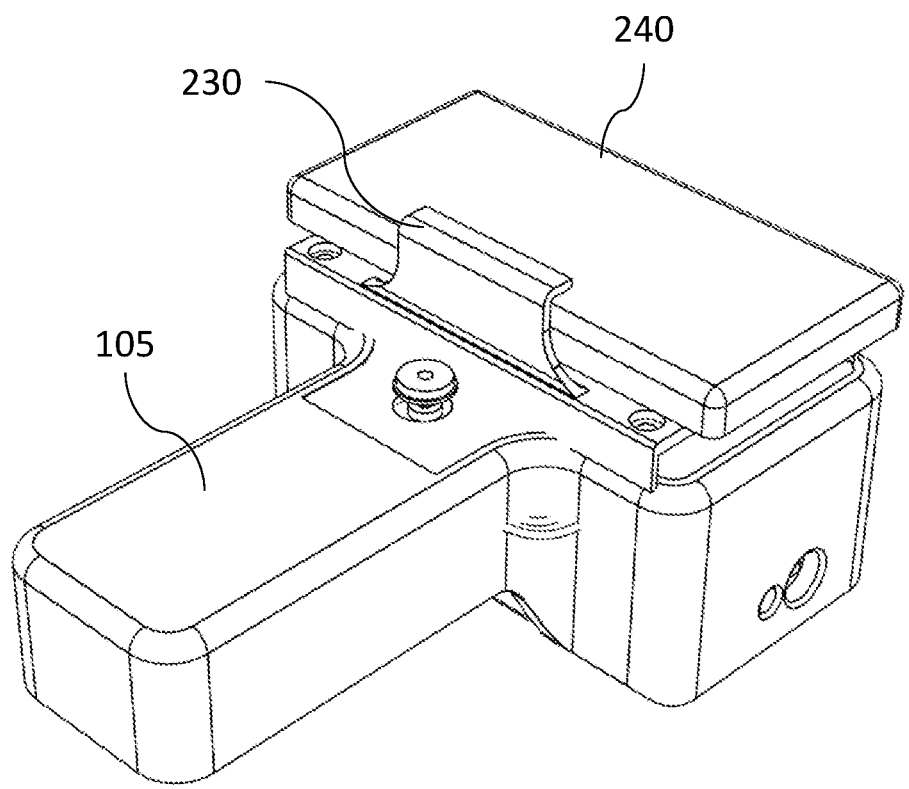
FIG. 5 is a perspective view of the electronic device further having a mounting plate on the front side, and a smartphone docked to the mounting plate, according to an exemplary embodiment of the present invention.

The device can include a microcontroller 170 having suitable software. It is to be noted that one or more functions of the disclosed device 100 can be performed in an external computing device, such as a smartphone. It is understood that different known computing devices such as laptops, computers, and tablet computers can be used without departing from the scope of the present invention. The disclosed device can connect to an external computing device through a wired or wireless network. Examples of wireless networks can include Wi-Fi and Bluetooth. The disclosed device can include a mounting plate 230 as shown in FIG. 5 to which an external mobile computing device 240, such as a smartphone can be mounted. An interface on the external mobile computing device 240 can allow communications with the disclosed device. The measurements and other parameters can be shown on the external mobile computing device 240 through the interface as well as inputs such as the predetermined distances for the target point can also be received through the interface. A software application can be provided for the smartphone that can be configured to input and display different parameters. Moreover, the smartphone can be equipped with sensors, such as an accelerometer and a gyroscope. The same sensors can be used for the operation of the disclosed device saving manufacturing cost. The microcontroller can receive an angle value from the accelerometer and the gyroscope. The angle value can relate to an orientation of the smartphone and thus the electronic device. It is understood, however, that the external computing device can be optional and all the functionality, such as accelerometer and the gyroscope can be built into the disclosed device 100.

The onboard microcontroller of the device 100 can process programming to perform one or more functions of the disclosed invention. The software algorithm can register and store measurements and uses these stored values for calculation and manipulation of the desired results. The interface can also work with the target point marking unit that can include a marker and an actuator, to effectively mark the target point on the surface. The inputs, i.e., predetermined distances for the target points can be fed, as input through manual entry or a CAD program, into the memory of the microcontroller. The device can output instructions that can be followed by a user to locate a target point on the surface. Audio alerts, such as beeps can be used to show the closeness of the device to the target point or the device reaching the target point. The sounds produced by the device can change in type or intensity as the measured distances approaches the predetermined distance. A tone can be outputted when the measured distances are substantially equal to the predetermined distances. Automated actuation of the marker to mark the target point on the surface when the measured distances or location of the intersection point is substantially the same as the location of the target point, can also be implemented. The substantially herein indicates that the measured distances may not be equal to be pre-determined distances, but a threshold or a range can be preset in the device. The device reaching the target point can also be visually animated, such as the values of measured distances on the display can have a highlighted background. A green background can indicate the value of the measured distance is substantially equal to the pre-determined distance, orange can suggest closeness, and red can suggest a substantial difference. Thus, out of three values, one can be displayed with green, while the other can be displayed with orange, and the last one can be displayed with a red background, depending upon the position of the device.

The software algorithm can have the ability to have the points marked virtually or in a CAD platform, which can be imported into the memory of the device and processed based on the software instructions of the device for processing and application. The software can allow the user to align the reference planes and origin points to the actual aligned origins/datum created as part of the initial device setup. This feature can enable programmed standard patterns and custom designs to be loaded into the device to easily obtain any number of custom patterns marking on the wall/substrate/surface without the complications of calculations. It is to be noted that the terms "surface" and "substrate" are interchangeably used herein. The algorithm can guide the user to make the markings when the desired target points are reached.

In one exemplary embodiment, to hang a picture on a wall at a target point i.e., at 3 feet from the ceiling and 4 feet from a nearby sidewall. The ceiling and the sidewall can be taken as reference points and the device can be bought closer to the wall. The distances of the intersection point of the device from the two reference points can be shown by the device on the display panels or the smartphone. The user can move the device so that the two display panels show 3 feet and 4 feet. Once, the desired distances are visible, the device can be placed on the wall and the button can be pressed to actuate the marker, marking the target point on the wall.

In one embodiment, the functionality of the stud finder can also be incorporated within the disclosed device 100. The device can also be provided with the functionality to detect wires and pipes running within the wall. The device can be powered by batteries, either disposable or rechargeable, wherein the batteries can be incorporated within the housing. In the case of rechargeable batteries, a suitable charging circuitry can also be incorporated. It is understood that any other means of powering the device known to a skilled person for powering portable electronic devices are within the scope of the present invention.

The software can have the points marked virtually or in CAD platforms, which can be imported into the software algorithm for processing and application. The software can allow the user to align the reference planes and origin points to the actual aligned origins/datum created as part of the initial device setup. This feature can enable programmed standard patterns and custom designs to be loaded into the device to easily obtain any number of custom patterns marking on the wall/substrate without the complications of calculations. The algorithm can guide the user to make the markings when the desired marking points are reached.

This device can engage the user to preset an origin or a reference system. This information can be stored in the software logic for deriving further calculations and derivatives of the distance measurements. This subsequently enables other measurements from the saved preset origin or datum point. A measure of the relative distance from the preset origin or a reference point. This can be used in determining a set of 2D/3D points in space. Also, the programming on the electronic interface can allow for this device to store and relay a set of pre-programmable complex patterns from a template file interface.

In one exemplary embodiment, the marker can be substituted with an electronic pen with logic that can be used to create wall arts or large-scale artwork on the customized substrate. The electronic pen deposits or applies the paint/ink automatically as the device is moved on the substrate. The electronic pen can apply the ink at the prescribed or programmed patterns/pictures.

In one aspect, disclosed is a method for marking a target point on a substrate using the disclosed device. First, a software application for a smartphone or similar computing device can be downloaded on the smartphone. The device can then be connected to the smartphone through a wired or wireless connection. The marker and marker tip can be checked for accuracy. If required, the same can be replaced or suitable calibrations can be performed. In the device, the origin or reference coordinate system can be set by the user. Thereafter, locate the device against the substrate, use appropriate non-marking pads, preferably against a corner adjacent planes/substrate. Adjusting the alignment system to the adjacent planes, which ensures the distance is truly perpendicular to the corresponding reference plane, repeats the process for other reference planes in question. Once the alignment can be completed, the mobile application can be used to save the reference planes as the datum and a custom name can be associated with the datum optionally. The stored datum can be retrieved and used for future measurements. The device can now be ready to take live measurements, and the application can display the measurements on the smartphone. Upon locating the target point, the mark command on the application or the manual button can be triggered to visually mark the target point.

Again, referring to FIG. 1, which shows the handle 190 that can be grabbed by hand to hold the device. On the rear side of the device, as shown in FIG. 3, can be provided felt pads 200 to protect against hard surfaces. The felt pads can also provide a suitable grip on a surface. On the rear side can also be seen a toggle button 210 that can be used to turn the device on and off. FIG. 5 shows another embodiment of device 105 that can include a dock 230 to which a smartphone 240 can be mounted.

Often measurements and intersections points for previously marked target points may be needed by a used to refer to. The disclosed device can store the distances and intersection points for future reference.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. An electronic device for simultaneously measuring distances from two or more reference points in space to locate a target point on a surface, the electronic device comprises:
   a housing having a front wall, a rear wall, a left wall, a right wall, a top wall, and a bottom wall;
   at least two multi-axis distance measurement sensors encased in the housing, wherein the at least two multi-axis distance measurement sensors are configured to simultaneously measure distances of an intersection point on the rear wall of the housing from at least two reference points in space respectively; and
   a display on the front wall of the housing configured to display values of the measured distances,
   wherein the housing further comprises a handle forming a T-shape, wherein the handle is configured to be grabbed in a hand for operating the electronic device,
   wherein the housing further comprises a central aperture in the rear wall, the electronic device further comprises a marking unit encased in the housing, the marking unit has a tip, the tip configured to protrude from the central aperture, wherein a center of the central aperture, the tip of the marker, and the intersection point coincide,
   wherein the electronic device further comprises a button configured to be operated to actuate the marking unit, wherein actuation of the marking unit results in extension of the tip of the marker from the central aperture.

2. The electronic device according to claim 1, wherein the at least two multi-axis distance measurement sensors comprise three multi-axis distance measurement sensors, the housing has three sensor apertures in the left wall, the top wall, and the right wall respectively for the three multi-axis distance measurement sensors, the three multi-axis distance measurement sensors configured to simultaneously measure the distances of the intersection point from three reference points.

3. The electronic device according to claim 2, wherein the three multi-axis distance measurement sensors are encased in three sensor units, wherein each of the three sensor units further comprises a laser, wherein the three lasers are configured to point at the respective three reference points.

4. The electronic device according to claim 1, wherein the electronic device further comprises a microcontroller, the microcontroller configured to:
   present an interface for interacting with the electronic device, and
   receive and store values of predetermined distances for the target point.

5. The electronic device according to claim 4, wherein the electronic device further comprises an accelerometer and gyroscope.

6. The electronic device according to claim 4, wherein the electronic device further comprises a mounting plate disposed on the front wall of the housing, the mounting plate configured to dock a mobile computing device, wherein the microcontroller configured to operably coupled to the mobile computing device.

7. The electronic device according to claim 6, wherein the mobile computing device is a smartphone, the microcontroller configured to implement an interface on the smartphone, the interface configured to operate an accelerometer and a gyroscope of the smartphone.

8. A method for simultaneously measuring distances from two or more reference points in space to locate a target point on a surface, the target point is at pre-determined distances from the two or more reference points, the method comprising the steps of:
  providing an electronic device comprising:
    a housing having a front wall, a rear wall, a left wall, a right wall, a top wall, and a bottom wall,
    at least two multi-axis distance measurement sensors encased in the housing, wherein the at least two multi-axis distance measurement sensors configured to simultaneously measure distances of an intersection point on the rear wall of the housing from at least two reference points in space respectively, and
    a display on the front wall of the housing configured to display values of the measured distances,
    wherein the housing further comprises a handle forming a T-shape, wherein the handle is configured to be grabbed in a hand for operating the electronic device,
    wherein the housing further comprises a central aperture in the rear wall, the electronic device further comprises a marking unit encased in the housing, the marking unit has a tip, the tip configured to protrude from the central aperture, wherein a center of the central aperture, the tip of the marker, and the intersection point coincide,
    wherein the electronic device further comprises a button configured to be operated to actuate the marking unit, wherein actuation of the marking unit results in extension of the tip of the marker from the central aperture;
  positioning the electronic device on the surface;
  repositioning the electronic device relative to the surface until the measured distances are substantially same as the pre-determined distances; and
  upon repositioning the device, actuating the button.

9. The method according to claim 8, wherein the at least two multi-axis distance measurement sensors comprise three multi-axis distance measurement sensors, the housing has three sensor apertures in the left wall, the top wall, and the right wall respectively for the three multi-axis distance measurement sensors, the three multi-axis distance measurement sensors configured to simultaneously measure the distances of the intersection point from three reference points.

10. The method according to claim 9, wherein the three multi-axis distance measurement sensors are encased in three sensor units, wherein each of the three sensor units further comprises a laser, wherein the three lasers are configured to point at the respective three reference points.

11. The method according to claim 8, wherein the electronic device further comprises a microcontroller, the microcontroller configured to:
  present an interface for interacting with the electronic device, and
  receive and store values of predetermined distances for the target point, wherein the method further comprises the step of:
    receiving the pre-determined distances through the interface.

12. The method according to claim 11, wherein the electronic device further comprises an accelerometer and gyroscope.

13. The method according to claim 11, wherein the electronic device further comprises a mounting plate disposed on the front wall of the housing, the mounting plate configured to dock a mobile computing device, wherein the microcontroller configured to operably coupled to the mobile computing device.

14. The method according to claim 13, wherein the mobile computing device is a smartphone, the microcontroller configured to implement an interface on the smartphone, the interface configured to operate an accelerometer and a gyroscope of the smartphone, wherein the method further comprises the steps of:
  receiving, by the microcontroller, an angle value from the accelerometer and the gyroscope.

* * * * *